US006834678B2

(12) United States Patent
Santa

(10) Patent No.: US 6,834,678 B2
(45) Date of Patent: Dec. 28, 2004

(54) PUMP VALVE

(75) Inventor: Joseph Luiz Santa, Belmont (AU)

(73) Assignee: Joe Santa & Associates Pty Limited, Toronto West (AU)

( * ) Notice: Subject to any disclaimer, the term of this patent is extended or adjusted under 35 U.S.C. 154(b) by 31 days.

(21) Appl. No.: 10/155,248

(22) Filed: May 24, 2002

(65) Prior Publication Data
US 2002/0179163 A1 Dec. 5, 2002

(30) Foreign Application Priority Data
May 30, 2001 (AU) .............................................. PR5343

(51) Int. Cl.[7] ......................... F16K 15/03; F04B 53/10
(52) U.S. Cl. .................................... 137/852; 137/527.6
(58) Field of Search ............................. 137/527, 527.6, 137/843, 852, 855

(56) References Cited
U.S. PATENT DOCUMENTS 1,406,799 A   2/1922   Wood
1,827,913 A   10/1931  Rymal
3,752,366 A * 8/1973  Lawrence, Jr. ............... 222/207
4,172,465 A   10/1979  Dashner ................. 137/533.27
4,928,725 A   5/1990   Graves ..................... 137/269.5
5,622,484 A   4/1997   Taylor-McCune et al. .. 417/393

FOREIGN PATENT DOCUMENTS

FR   1515099    1/1968
GB   2279135   12/1994

* cited by examiner

Primary Examiner—Ramesh Krishnamurthy
(74) Attorney, Agent, or Firm—Ladas & Parry LLP

(57) ABSTRACT

A one-way fluid valve member (10) to be mounted on a valve (12) body having a valve opening (18) surrounded by a valve seat (16). The valve member (10) includes,: a valve closure part (14) to be movably mounted on the body (12) for movement relative thereto between a first position engaging the seat (16) to prevent movement of fluid through the opening (18) in a predetermined direction, and a second position spaced from the seat (16) to allow fluid to pass through the opening (18) in a direction opposite the predetermined direction; and wherein the valve closure part (14) has a convex surface to engage the seat (16) so as to project into the opening (18).

7 Claims, 5 Drawing Sheets

PUMP VALVE

FIELD OF THE INVENTION

The present invention relates to pumps and more particularly but not exclusively to a flap valve for a pump.

BACKGROUND OF THE INVENTION

Common valve assemblies (such as that disclosed in the Applicant's International Application PCT/AU93/00086 (WO9318305)) are generally made in three pieces and include a first hinged plate, a valve, a further hinged plate and nuts cooperating with screw inserts to form a valve assembly. Under the influence of pressure, the hinge valve (or flap) pivots to open or close the valve opening. In this type of "three-piece" arrangement it has been found that problems arise when solids are caught under the hinge plate (flap). The obstructions have been found to prevent complete closure, resulting in a loss of vacuum causing the pump to stop.

It is therefore desirable to provide a one-piece valve assembly which overcomes these problems by having a higher hinge point and a more penetrating closure mechanism. This type of arrangement would also be effected less by the build up of solids due to its better clearance.

OBJECT OF THE INVENTION

It is the object of the present invention to overcome or substantially ameliorate at least one of the above disadvantages or to provide a useful alternative.

SUMMARY OF THE INVENTION

There is firstly disclosed herein a one-way fluid valve member to be mounted on a valve body having a valve opening surrounded by a valve seat, said valve member including:
 a valve closure part to be movably mounted on said body for movement relative thereto between a first position engaging said seat to prevent movement of fluid through said opening in a predetermined direction, and a second position spaced from the seat to allow fluid to pass through said opening in a direction opposite said predetermined direction; and wherein
 said valve closure part has a convex surface to engage said seat so as to project into said opening.

There is further disclosed herein a one-way fluid valve member to be mounted on a valve body having a valve opening surrounded by a valve seat, said valve member including:
 a valve closure part to be movably mounted on said body for movement relative thereto between a first position engaging said seat to prevent movement of fluid through said opening in a predetermined direction, and a second position spaced from the seat to allow fluid to pass through said opening in a direction opposite said predetermined direction;
 a hinge member to mount said valve part on said body, said hinge member being resiliently deformed to provide for said movement; and wherein
 said valve closure part maintains its configuration during movement as said hinge resiliently deforms.

Preferably, said valve seat is located in a plane, and said valve member is connected to said body by a pivot spaced from said plane opposite said predetermined direction.

Preferably, said valve member is of a unitary construction.
Preferably, said valve part includes a pair of longitudinally extending arms connected to said pivot.
Preferably, said arms are flexible.
Preferably, said space defines a channel for fluid flow.

BRIEF DESCRIPTION OF THE DRAWINGS

A preferred form of the present invention will now be described by way of example only with reference to the accompanying drawings wherein.

DETAILED DESCRIPTION OF THE PREFERRED EMBODIMENTS

Figure 1:
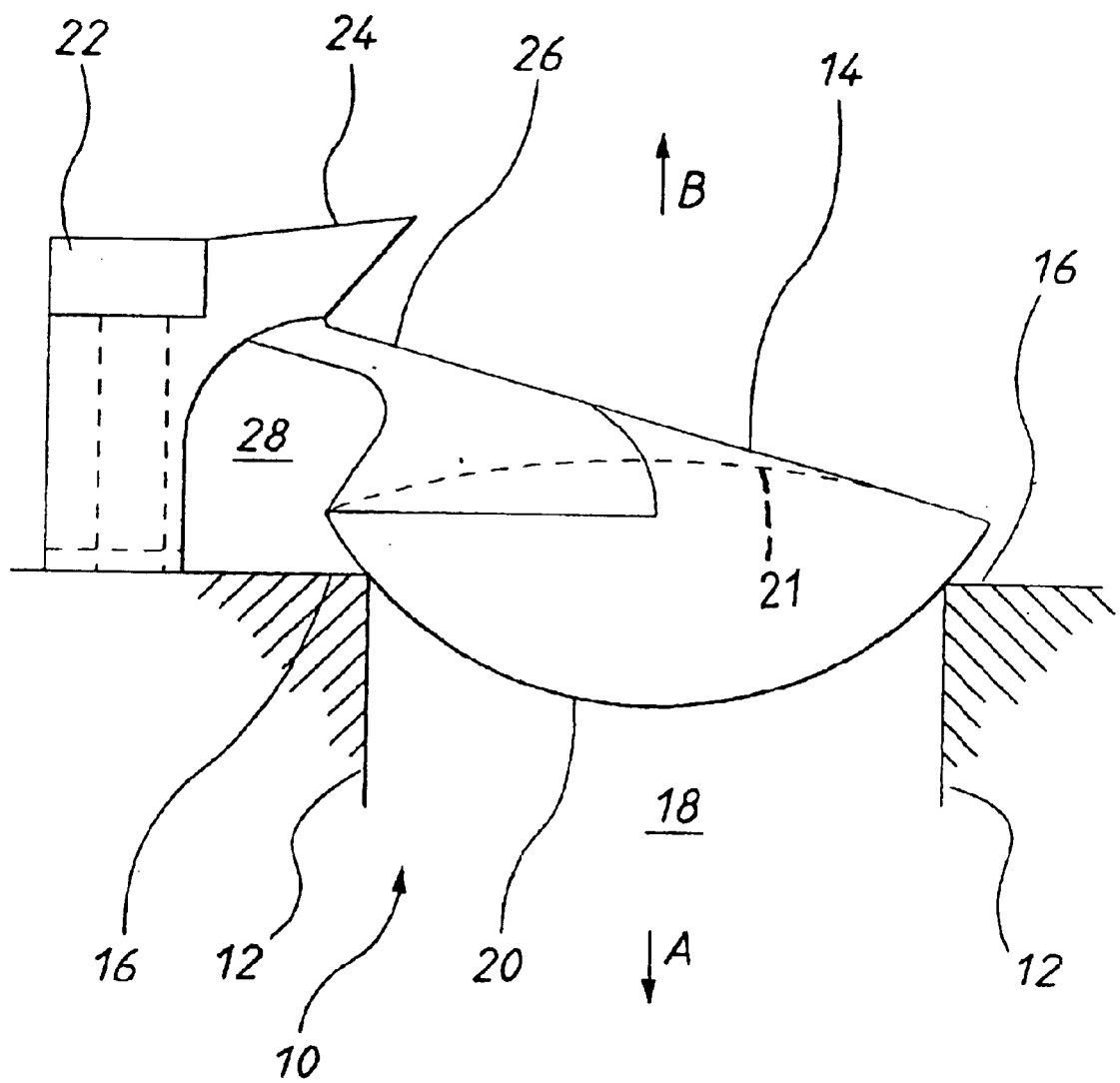
FIG. 1 is schematic side view of a valve member in accordance with an embodiment of the invention.
Figure 2:
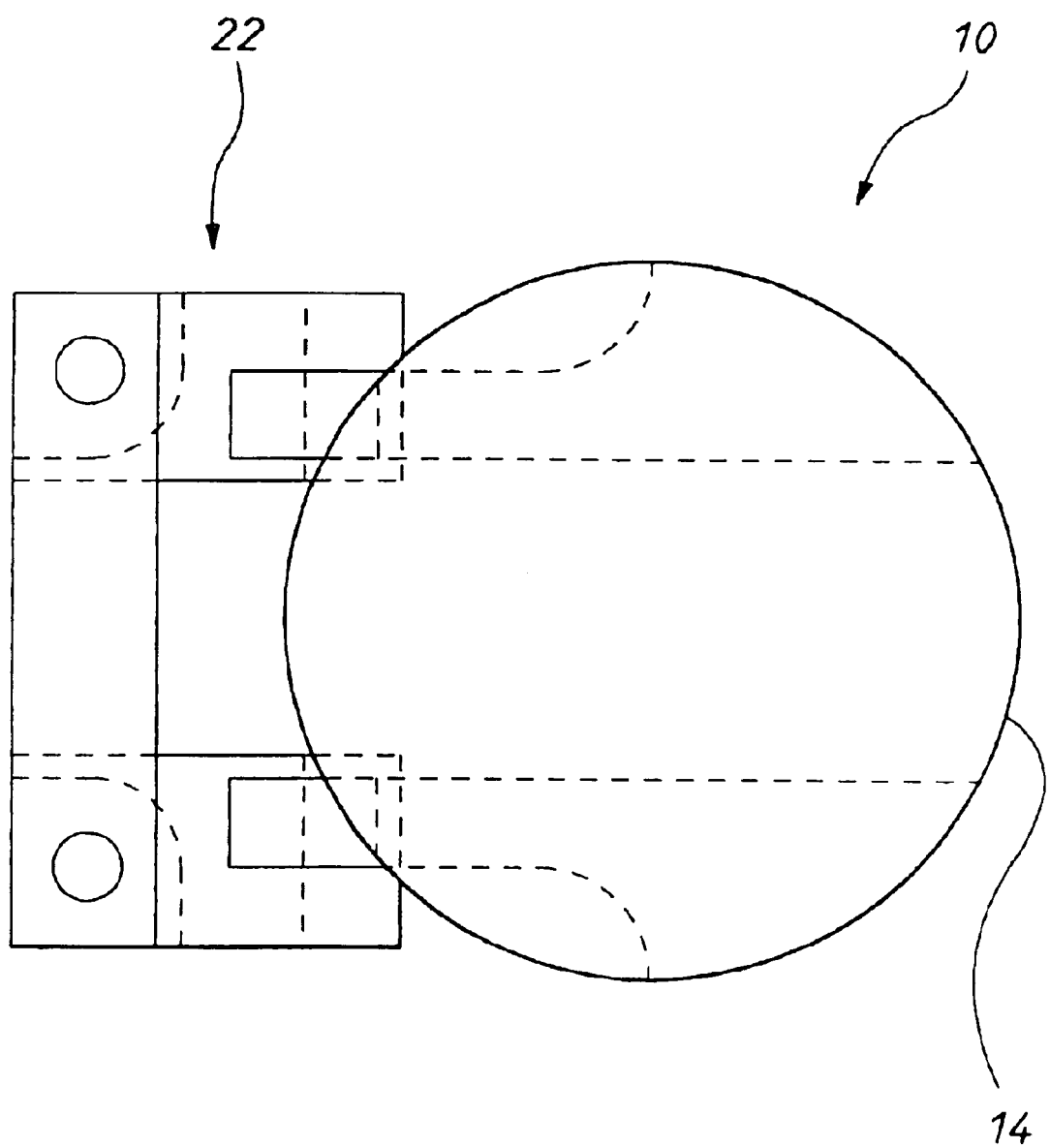
FIG. 2 is a bottom view of the valve of FIG. 1.
Figure 3:
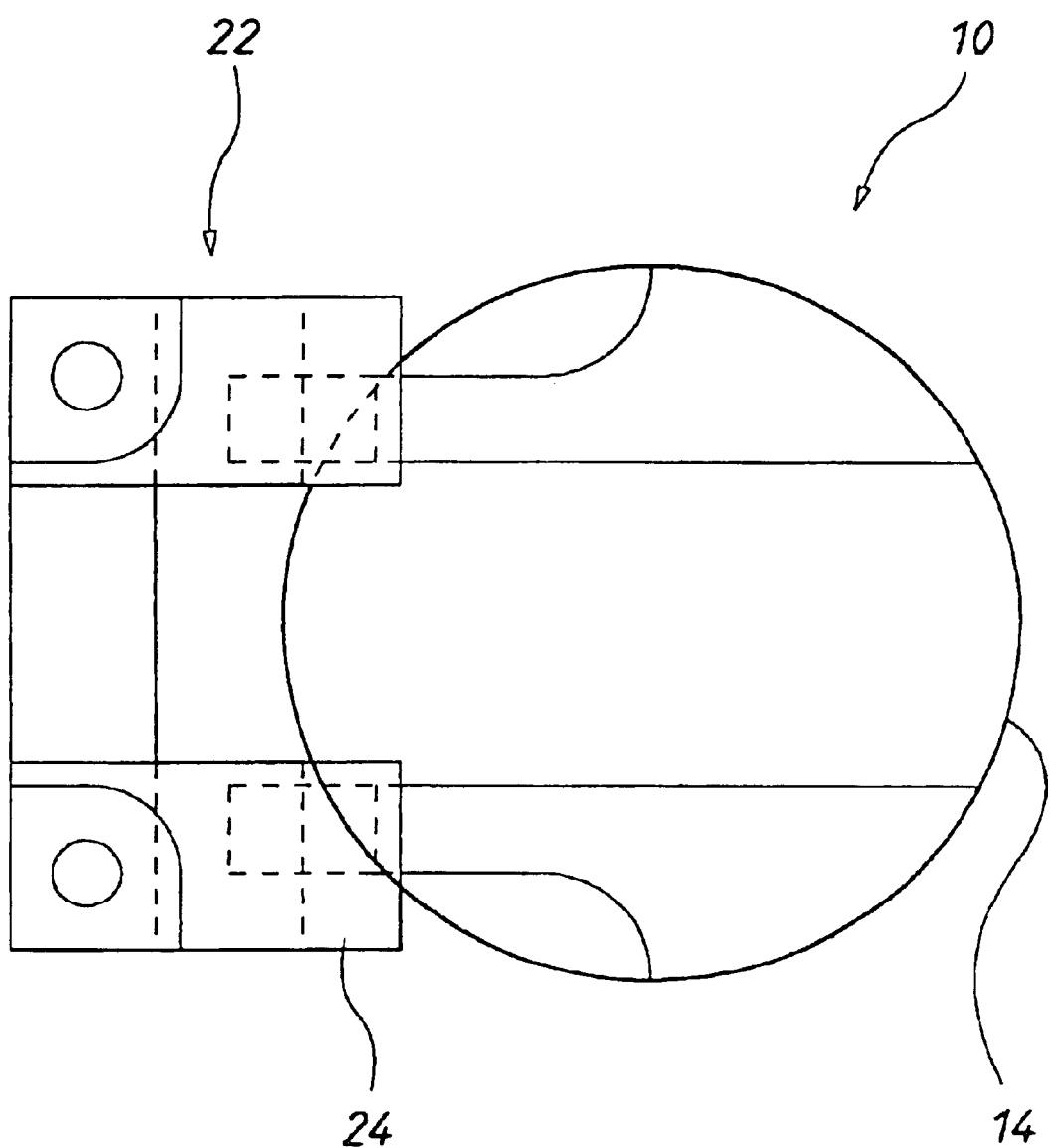
FIG. 3 is a top view of the valve of FIG. 1.
Figure 4:
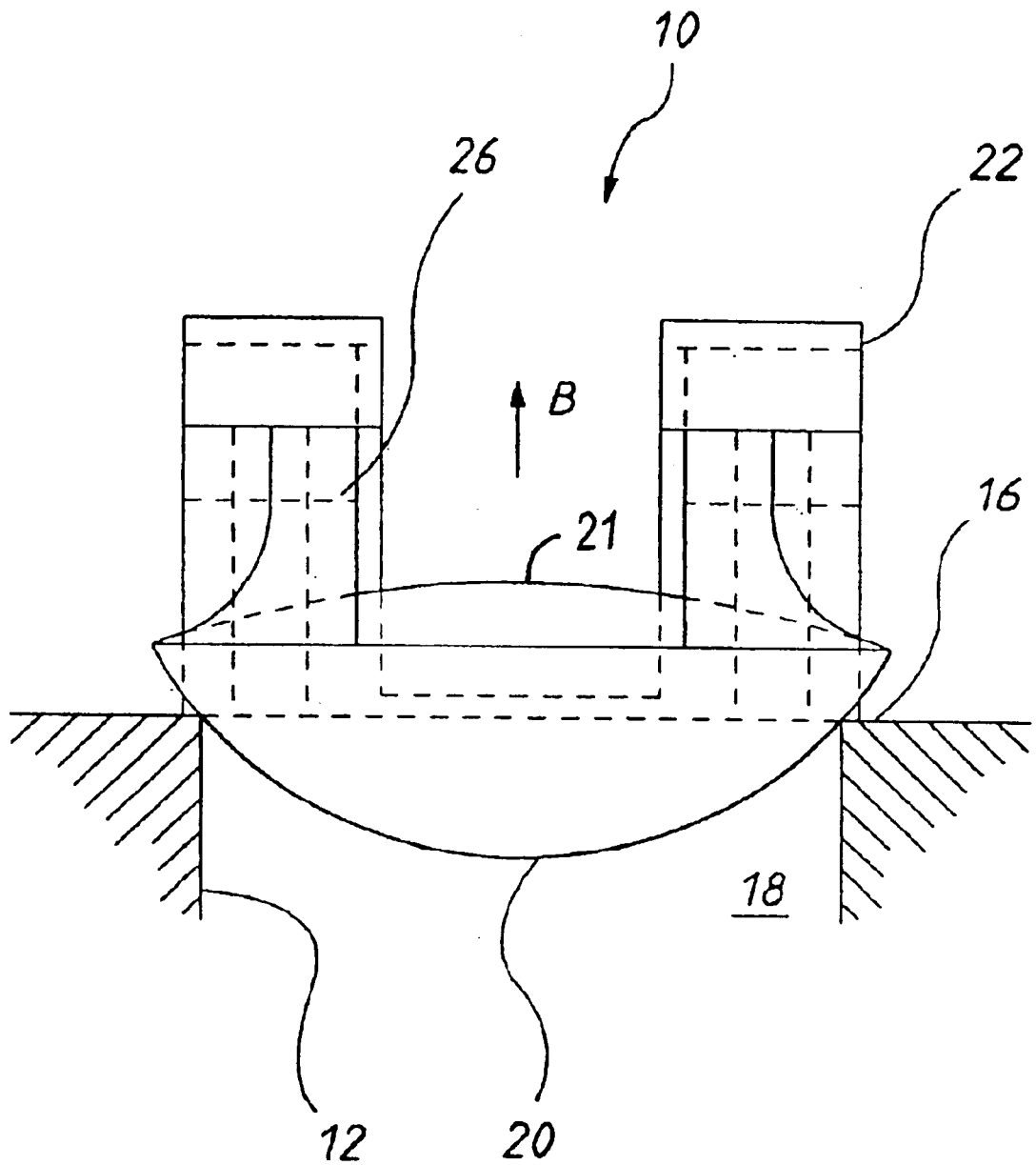
FIG. 4 is a front view of the valve of FIG. 1.
Figure 5:
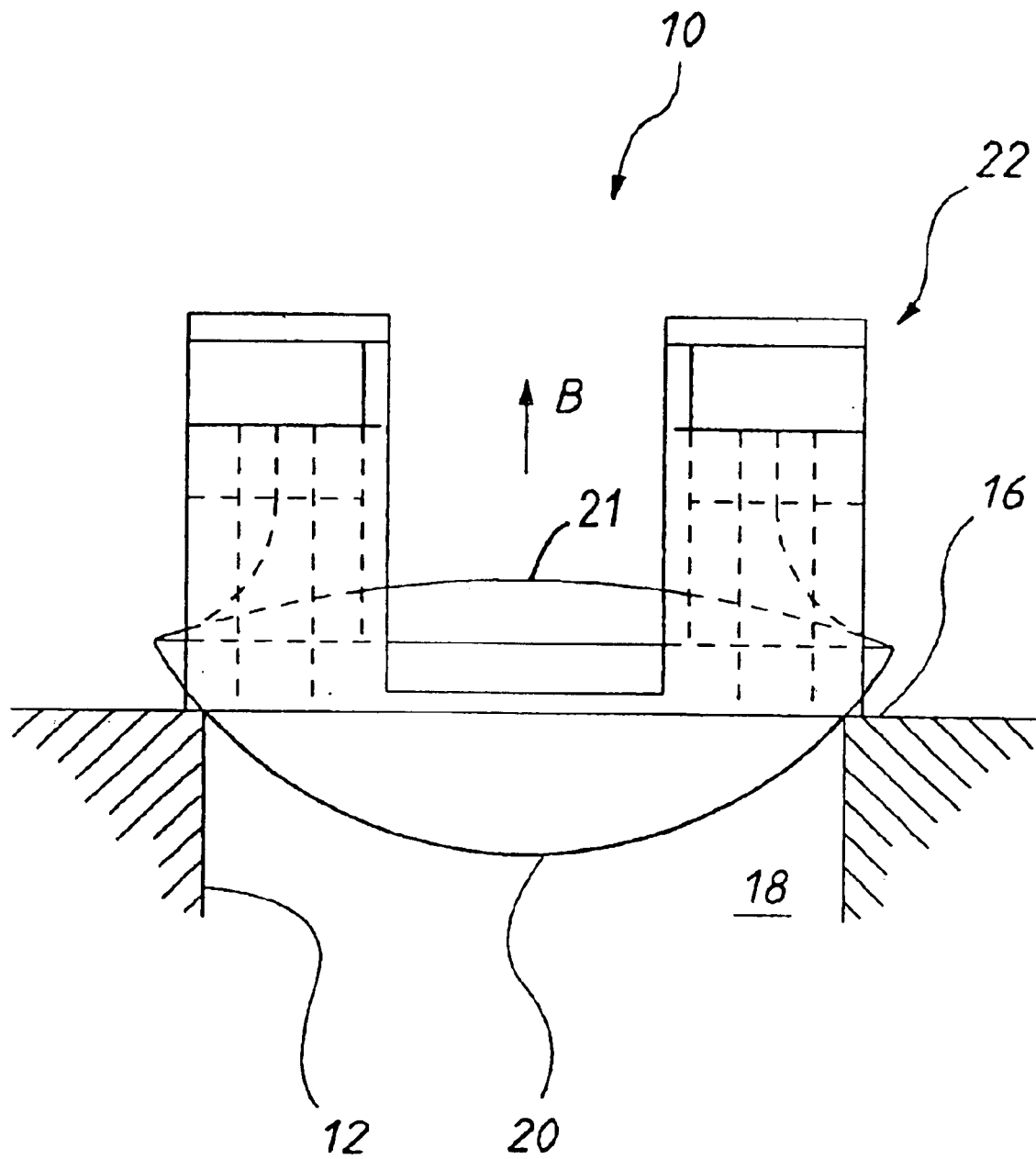
FIG. 5 is a rear view of the valve of FIG. 1.

In FIGS. 1 to 5 of the accompanying drawings, there is schematically depicted a one-way fluid valve member 10 to be mounted on a valve body 12. Valve body 12 is part of a pump system which would normally include such features as a number of pump chambers being interconnected to allow fluid flow between a number of inlets and outlets. The valve member 10 is made of a unitary construction and preferably out of rubber or similar type products. Valve member 10 includes a valve closure part 14 movably mounted on the body 12 for movement relative thereto between a first position engaging a valve seat 16 to prevent movement of fluid through a valve opening 18 in a predetermined direction (Arrow A) and a second position spaced from the seat 16 to allow fluid to pass through the opening in a direction opposite the predetermined direction (Arrow B). The valve closure part 14 has convex top and bottom surfaces 21, 20 the bottom surface 20 is adapted to engage the seat 16 and project into the opening 18 as best shown in FIG. 1. As best shown in FIG. 4 the top convex surface 21 is opposed to the bottom convex surface 20 and provides strength to the valve member 10 when under pressure.

The valve member 10 can further include a hinge member 22 mounted on the body 12. The hinge member 22 projects away from the plane of the valve seat 16 opposite the predetermined direction Arrow B and includes a resiliently deformable hinge pivot portion 24 which is connected to the valve closure part 14 upstream of the closure part by a pair of longitudinal extending arms 26. In use, the valve part 14 maintains its configuration during movement whilst the pivot portion 24 resiliently deforms. In one preferred embodiment, the arms 26 could also be deformable.

As best seen in FIG. 1, when the hinge member 22 is displaced away from the plane of the seat 16 (that is, in the direction of Arrow B) and the valve closure part 14 (being connected to the hinge pivot portion 24) is in contact with the seat 16, a channel 28 is formed which provides an avenue for fluid to flow without interfering or preventing the closure of valve closure part 14 with the seat 16. This results in the vacuum created within the pump system being maintained and stops any interruption to pumping. Further, due to the convex bottom surface 20 of the valve part 14, better vacuum closure can be obtained further increasing the efficiency of the pump.

Although the invention has been described with reference to specific examples, it will be appreciated by those skilled in the art that the invention may be embodied in many other forms.

The claims defining the invention are as follows:

1. A one-way fluid valve member to be mounted on a valve body having a valve opening surrounded by a valve seat located in a plane, said valve member including:

a valve closure part to be movably mounted on said valve body for movement relative to said valve body by flow of said fluid in predetermined and opposite directions between a first position engaging said valve seat to prevent said flow of said fluid through said opening in said predetermined direction, and a second position spaced from said valve seat to allow said fluid to pass through said opening in said opposite direction; and a hinge member to mount said valve closure part on said body and including a pivot portion, the pivot portion being spaced from said valve closure part in said opposite direction, and at least one arm attaching said valve closure part to said pivot portion, said hinge member and valve closure part defining a channel for flow of said fluid, wherein said valve closure part maintains its configuration during said movement, said movement being at least partly provided by resilient deformation of said pivot portion, and a portion of said pivot portion is spaced in said opposite direction over said arm for preventing said second position of said valve closure part from projecting in said opposite direction sufficiently that flow of said fluid in said predetermined direction will not move said valve closure part to said first position.

2. A one-way fluid valve member according to claim 1, wherein said valve closure part includes a pair of longitudinally extending arms attaching said valve closure part to said pivot portion.

3. A one-way fluid valve member according to claim 2, wherein said arms are flexible.

4. A one-way fluid valve member according to claim 1, wherein said valve member is of a unitary construction.

5. A one-way fluid valve member according to claim 2, wherein said valve member is of a unitary construction.

6. A one-way fluid valve member according to claim 3, wherein said valve member is of a unitary construction.

7. A one-way fluid valve member according to claim 1, wherein said valve closure part has a convex top and bottom surface, said bottom surface to engage said seat so as to project into said opening.

* * * * *